United States Patent [19]

Rungger et al.

[11] Patent Number: 4,604,011

[45] Date of Patent: Aug. 5, 1986

[54] METHOD AND APPARATUS FOR EDGE-PLANING SHEET METAL

[75] Inventors: Helmut Rungger, Roitham; Erwin Fuchs, Altmünster; Johann Knoll, Schörfling, all of Austria

[73] Assignee: Dr. Techn. Ernst Linsinger & Co. GmbH, Steyrermühl, Austria

[21] Appl. No.: 794,966

[22] Filed: Nov. 5, 1985

Related U.S. Application Data

[63] Continuation of Ser. No. 485,416, Apr. 15, 1983, abandoned.

[30] Foreign Application Priority Data

Feb. 8, 1983 [DE] Fed. Rep. of Germany ....... 3304201

[51] Int. Cl.⁴ .............................................. B23C 3/12
[52] U.S. Cl. .................................... 409/138; 409/132; 51/112
[58] Field of Search ............... 409/131, 132, 137, 138, 409/139, 140, 204; 51/112, 113, 116, 117, 118, 109 R, 110; 29/33 S

[56] References Cited

U.S. PATENT DOCUMENTS

| 131,962 | 10/1872 | Merrill | 409/138 |
|---|---|---|---|
| 510,454 | 12/1893 | Wagner et al. | 51/116 |
| 1,328,242 | 1/1920 | Farley | 51/110 |
| 1,906,731 | 5/1933 | Wuerfel | 51/116 |
| 1,920,076 | 7/1933 | Happel | 51/112 |
| 3,117,477 | 1/1964 | Cardell | 409/138 |

FOREIGN PATENT DOCUMENTS 59360 9/1982 European Pat. Off. .......... 51/109 R

Primary Examiner—Gil Weidenfeld
Assistant Examiner—Daniel W. Howell
Attorney, Agent, or Firm—Browdy and Neimark

[57] ABSTRACT

Method and apparatus for machining the edges of sheet-like work pieces, using cutting elements disposed on rotating milling tools. The invention uses a conical tool with cutting tools on the conical jacket thereof. The active cutting tool which is closest to the work piece is located in the plane of the machining and a conical angle α in the range of about 150° to about 180° is utilized.

6 Claims, 9 Drawing Figures

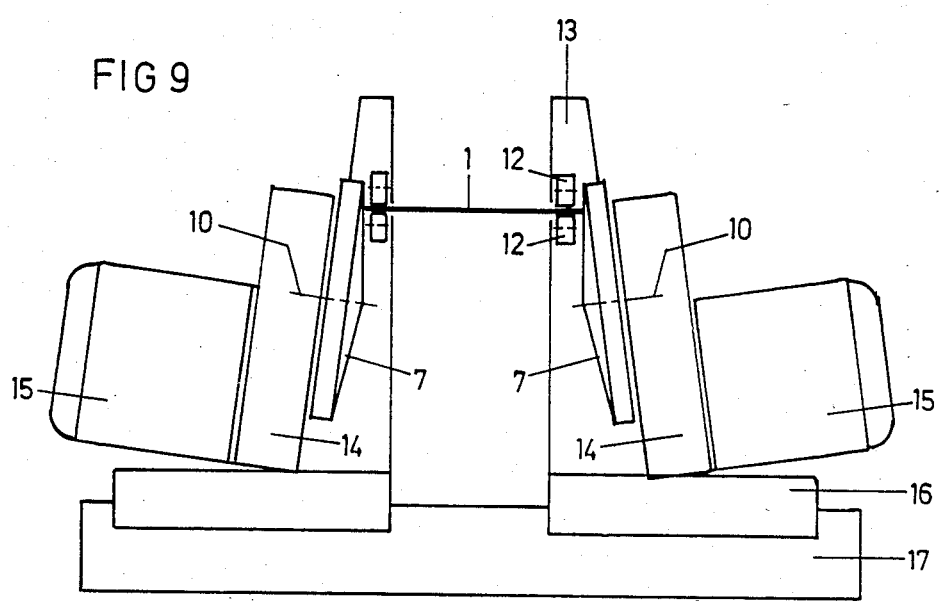

METHOD AND APPARATUS FOR EDGE-PLANING SHEET METAL

This application is a continuation of application Ser. No. 485,416, filed Apr. 15, 1983, now abandoned.

FIELD OF THE INVENTION

The invention relates to a method for machining the edges of sheet-like work pieoes, espeoially metal sheets (strips, plates, panels or the like) by means of cutters disposed on rotating milling tools.

BACKGROUND OF THE INVENTION

It is frequently necessary to prepare sheet-metal plates for further processing, for instance to produce pipes, in ship-building or the like, by milling them on the edges. Edge milling machines for this purpose are known, being used for panels or strips which are either moving or at rest.

In simple face milling, the axis of the milling head is located approximately in the plane of the sheet. The characteristic variable for milling is the so-called comma factor k, that is, the ratio between the miller feed per cut $S_v$ to the chip thickness s. In face milling, this comma factor is equal to 1.

In order to increase the comma factor and thus to increase the feed speed, circumferential milling is a further known machining process, where the axis of the milling head is located perpendicular to the plane of the sheet. The cutting angle $\beta$ is thus smaller than 90°. The comma factor is expressed as $K=1/\sin\beta$. As a result, the miller feed $S_v$ per cut is substantially greater than the chip thickness s. With an identical chip thickness, identical cutter speed and identical milling depth, it is therefore possible to perform milling with faster feeding. The larger the comma factor, the greater the diameter of the milling head and the smaller the cutting depth.

However, difficulties arise if very high feed speeds are desired. Although an enlargement of the milling head produces a reduction in the cutting angle $\beta$ and thus an increase in the comma factor, still this is associated with increased demand on the bearings increased space requirements, increased cost and greater difficulty in making a tool change.

If the number of cutters is increased while the diameter remains the same, the distance between cutters is then decreased, as is the chip space which a chip requires to roll out of the way.

The disposition of a plurality of milling heads one after the other results in great expense. The problem also exists of how to guide a curved sheet through a plurality of straight milling stations disposed in series.

SUMMARY OF THE INVENTION

It is accordingly the principal object of the present invention to provide a method and an apparatus particularly for performing this method with which a substantial increase in feed speed can be attained in a simple and economical manner, particulary by increasing the comma factor.

This object is attained in accordance with the invention in a method of the general type discussed above substantially in that a conical tool is used, with cutter tools disposed on the conical jacket e.g. the outer surface of the conical tool, that the generating element located closest to the sheet is located in the plane of the machining and that the conical angle $\alpha$ amounts to from 150° to 180°.

In accordance with a further development of the invention, it becomes possible to utilize still larger conical angles without the engagement point coming to be located outside the conical jacket; this is accomplished by an oblique positioning of the conical tool by a small angle $\delta$ about an axis perpendicular to the plane of the sheet in the direction of feed. This increase in the conical angle $\alpha$ produces an increase in the comma factor.

The rotational movement of the milling cone and the feed movement of the sheet may be in the same direction or in opposite directions.

The invention also encompasses an apparatus for machining metal sheets (strips, plates, panels or the like) by means of cutters disposed on rotating milling tools; this apparatus is characterized substantially in that the cutters are disposed on the jacket of a conical tool (head), that the generating element located closest to the sheet is in the plane of the machining, and that the conical angle $\alpha$ is selected to be from 150° to 180°.

It is true that the use of cone mills, especially those under 150°, for attaining a particular shape at the edges of metal sheets is known. However, the invention is not addressed to the shape of the edge of the metal sheet; instead, it utilizes the cone miller, including its oblique positioning, exclusively in order to increase the feed speed, a purpose for which conical angles below 150° and especially below 120° are unsuitable.

In a still further embodiment of the apparatus according to the invention, the axis of the conical tool is disposed such that it is inclined by a small angle about an axis perpendicular to the plane of the sheet in the direction of sheet feed.

In order to exploit the full movement path of the cone milling head over the sheet being machined, it is advantageous to provide cutting strips as cutters, the length of which equals the radial spacing between the outer edge of the cone and the inner edge of the sheet being machined.

An apparatus according to the invention for machining the edge of moving sheet-metal strips is characterized by two cone millers disposed symmetrically with respect to the center of the sheet being machined, which are driven by a motor via a gear mechanism; by means for pivoting the cone miller axes about an axis perpendicular to the plane of the sheet or through a predetermined angle $\delta$; and by means for adjusting the distance between the two cone millers in accordance with the width of the sheet being machined.

For making an adjustment or adaptation to a given width of a strip, it is advantageous for at least one (transverse) slide to be provided, which carries a cone miller with drive means.

Further details, characteristics and advantages will now be described, referring to the drawings.

BRIEF DESCRIPTION OF THE DRAWINGS

FIG. 9 shows an exemplary embodiment in schematic form.

DESCRIPTION OF THE PREFERRED EMBODIMENTS

Figure 1:
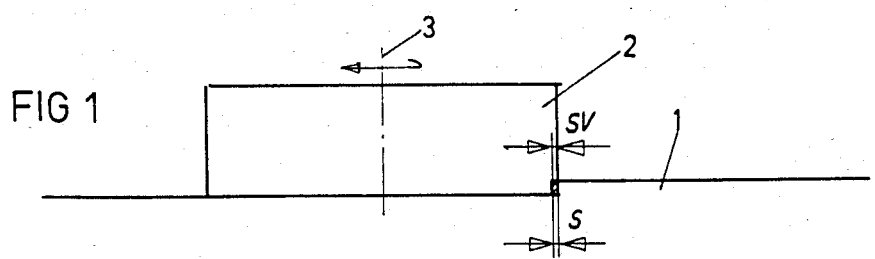
FIG. 1 is a schematic illustration of face milling.

In FIG. 1, the known process of face milling is shown. The axis 3 of an end milling head 2 is located in the plane of the metal sheet 1 which is to be edge-planed. It is immediately apparent that the miller feed per cut $S_v$ is equal to the chip thickness s. The result is a comma factor $k = S_v/s = 1$.

Figure 2:
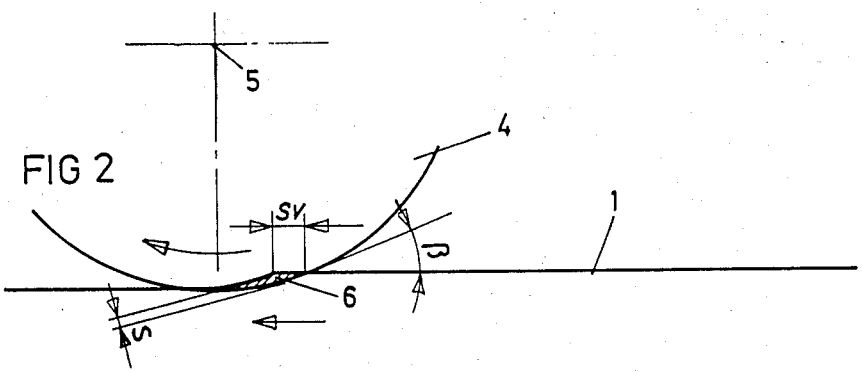
FIG. 2 is a schematic illustration of circumferential milling.

The known process of circumferential milling is shown schematically in FIG. 2. In this process, a circumferential milling head 4 rotates about an axis 5 e.g. the point at the intersection of the two crossing lines disposed perpendicular to the plane of the sheet 1. The comma factor is $k = 1/\sin\beta$, where $\beta$ is the angle of engagement between the sheet edge and the tangent at the circumferential point of the milling head 4 at the point of contact with the sheet edge. The chip 6 takes the shape of a comma.

Figure 3:
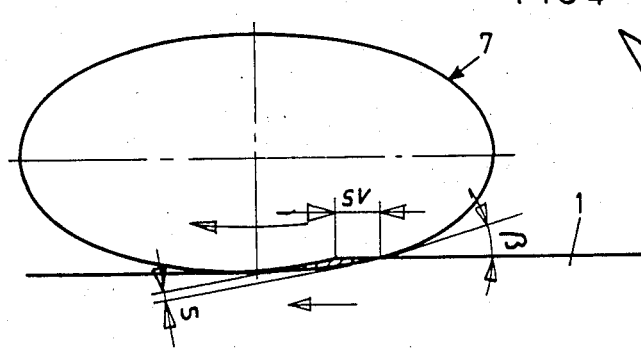
FIG. 3 is a schematic illustration of three-dimensional milling, in the form of an exemplary embodiment of a cone miller head according to the invention.
Figure 4:
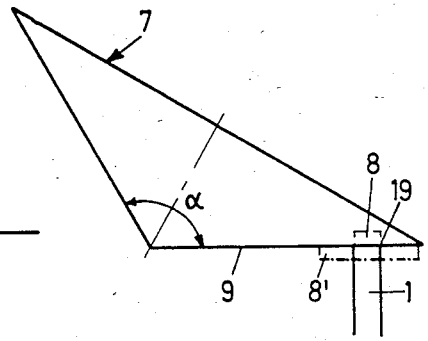
FIG. 4 shows an exemplary embodiment of a cone miller head according to the invention in a side view.
Figure 5:
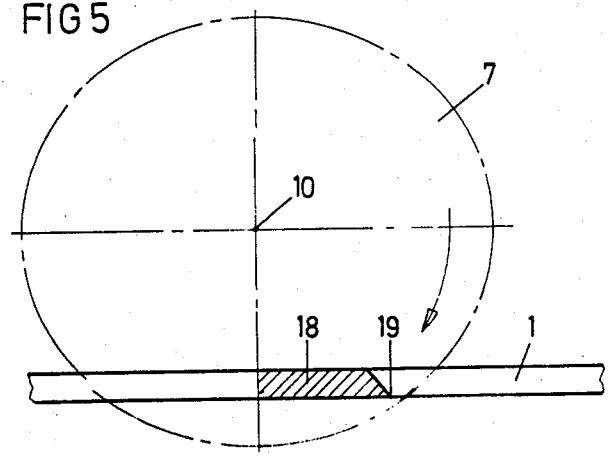
FIG. 5 is a plan view of FIG. 3.

In FIGS. 3, 4 and 5, the three-dimensional milling process according to the invention is shown. In this method, a conical milling head 7 is used, in which cutting elements such as cutting plates 8 or elongated cutter strips 8' are disposed on the jacket of the milling head 7, the axis 10 of which extends obliquely to the plane of the sheet 1. The intersection of the cone with the plane of the sheet produces a hyperbola with a very small angle of engagement $\beta$, so that a large comma factor is the result. The larger the opening angle $\alpha$ of the conical milling head (in the limiting case $\alpha = 180°$), the greater does the comma factor become, if the radius of the milling head remains the same. In this exemplary embodiment, a generating element 9 of the conical milling head 7 is located approximately perpendicular to the plane of the sheet 1.

The point of engagement 19 is indicated in FIG. 4 in the lower right corner of the sketched-in rectangle, which symbolizes the material which has been removed by machining. In FIG. 5, this point 19 is the lower right point of the shaded trapezoid, which symbolizes the chip 18, while the dot-dash line represents the boundary of the conical jacket.

In order to exploit the full movement path of the conical milling head over the sheet to be machined, it is efficacious, instead of cutting plates, to use cutting strips 8'.

Figure 6:
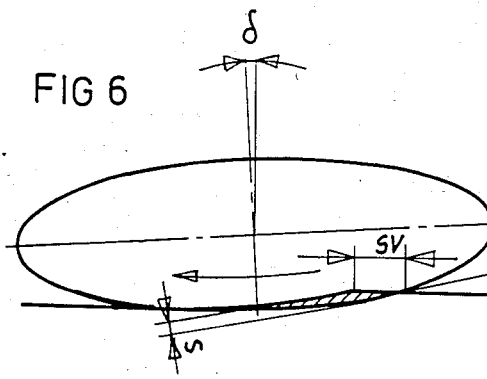
FIG. 6 shows a further exemplary embodiment in the plane of the sheet.
Figure 7:
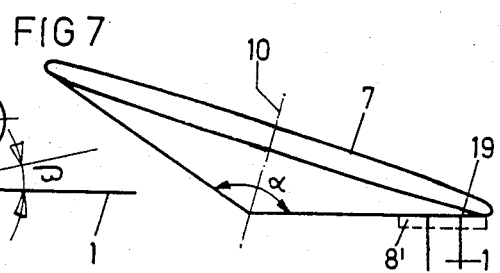
FIG. 7 shows the embodiment of FIG. 6 in a side view.
Figure 8:
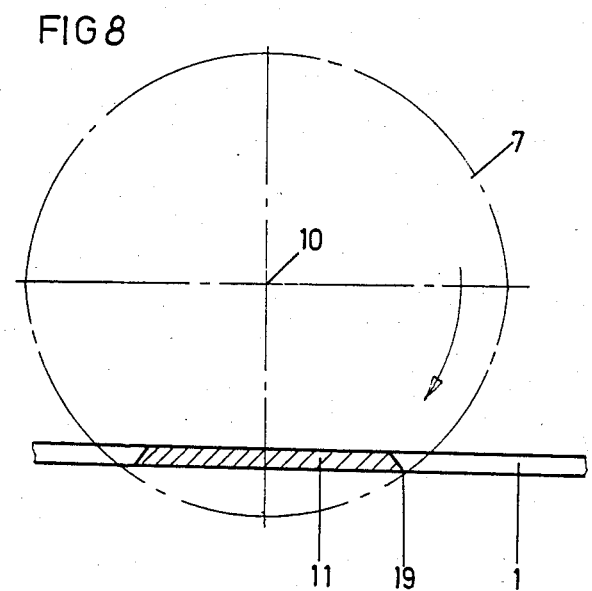
FIG. 8 shows the embodiment of FIG. 6 in a plan view.

A further increase in the comma factor k can be attained by inclining the axis 10 perpendicular to the plane of the sheet 1 by a small angle $\delta$ or by fixing it firmly, as shown in FIGS. 6, 7 and 8. The angle of engagement $\beta$ is reduced still further by means of this provision.

This oblique positioning makes it possible to attain greater machining depths with the same conical milling head 7, or to use flatter conical millers (that is, with wider opening angles $\alpha$) with the same machining depth and thus to attain greater comma factors.

In FIG. 9, an exemplary embodiment of an apparatus according to the invention is shown in schematic form. Two milling units, comprising a drive motor 15 which drives a conical milling head 7 via a gear mechanism 14, are disposed on a machine bed 17 such that they are displaceable relative to one another on slides 16. The slides 16 serve to effect adaptation to the width of a given sheet 1 supported in strip-guidance rollers 12 on stands 13.

In the exemplary embodiment shown in FIGS. 3-5, the axis 10 is located in the plane of the drawing. In contrast to this, the axis 10 in the exemplary embodiment shown in FIGS. 6-8 is inclined relative to the plane of the drawing.

The invention is not restricted to the exemplary embodiments shown and described herein. It further encompasses modifications and further developments within the competence of one skilled in the art as well as combinations of some or all of the characteristics and provisions described and/or shown herein.

What is claimed is:

1. A method for machining the edges of a work piece of sheet or sheet-like configuration, using cutting elements disposed on rotating milling tools, comprising the steps of
   using a conical cutting tool having a jacket,
   disposing cutting elements on the conical jacket of said cutting tool,
   locating the cutting element which is closest to work piece in the plane of machining at a conical angle and in the range of about 150° to about 180°,
   and inclining the axis of said conical tool by a relatively small angle $\delta$ about an axis perpendicular to the plane of the work piece.

2. A method as defined by claim 1, and further comprising the step of providing the rotational movement of the conical tool and the feed movement of the work piece in the same direction.

3. A method as defined by claim 1, and further comprising the step of providing the rotational movement of the conical tool and the feed movement of the work piece in opposite directions.

4. An apparatus for machining a work piece of sheet or sheet-like configuration by means of cutting elements disposed on rotating milling tools, comprising a conical tool having a conical angle $\alpha$ in the range of about 150° to about 180° and including a jacket, cutting elements disposed on said jacket of said conical tool such that each cutting element engaging said work piece is located in the plane of machining, and the axis of said conial tool is inclined by a relatively small angle $\delta$ about an axis perpendicular to the plane of the work piece.

5. An apparatus as defined by claim 4, wherein two cone millers are disposed symmetrically with respect to the center of the work piece and are driven by a motor via a gear mechanism, means for pivoting the cone miller axes about an axis perpendicular to the plane of the work piece, and means for adjusting the distance between the two cone millers in accordance with the width of the work piece being machined.

6. An apparatus as defined by claim 5, and at least one slide which carries a cone miller with its drive means for adjusting the strip width.

* * * * *